J. POMEROY.
Lamp Wick Raiser.
No. 38,933.   Patented June 16, 1863.
Fig. 1  Fig. 2  Fig. 3  Fig. 4
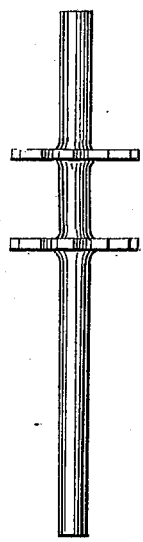
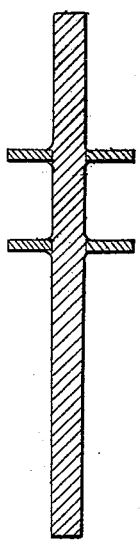
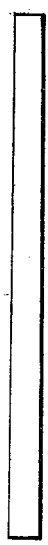
Fig. 5
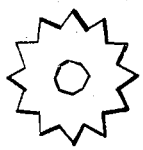
Witnesses
Milo Peck
Lucius G. Peck
Inventor:
John Pomeroy

UNITED STATES PATENT OFFICE.

JOHN POMEROY, OF DERBY, CONNECTICUT, ASSIGNOR TO HENRY A. SHIPMAN AND ROBERT HOADLEY, OF SAME PLACE.

IMPROVEMENT IN LAMP-WICK REGULATORS.

Specification forming part of Letters Patent No. 38,933, dated June 16, 1863.

*To all whom it may concern:*

Be it known that I, JOHN POMEROY, of the town of Derby, in the county of New Haven and State of Connecticut, have invented a new and useful improvement in wick-regulators for raising and lowering the wicks in kerosene and other lamps in which flat wicks are used; and I do hereby declare that the following is a full, clear, and exact description of the same, reference being had to the accompanying drawings, in which—

Figure 1 represents my improved regulator complete. Fig. 2 is a view of a section of the same cut longitudinally through the center pin or axis. Fig. 3 represents the center-pin as cut from the wire. Fig. 4 shows the manner in which the center-pin is upset so as to form a collar on each side of the spur-wheel, Fig. 5, and fill the octagonal-shaped hole in the wheel. This wheel is cut out of sheet metal.

Wick-regulators have been hitherto made by casting the wheels and center-pin together in one piece, or by simply driving the center-pin into a round hole in the spur-wheel.

The method by casting is costly and the result imperfect, and the regulator, when made by driving the center-pin into a round hole in the spur-wheel, is liable to soon get out of order by the wheel working loose on the pin.

In my improved wick-regulator the hole in the center of the spur-wheel is of any proper form not circular, (a hexagon, octagon, or other like figure is most convenient,) into which the center-pin is inserted. The center-pin and spur-wheel are then placed in an upsetting-machine, and by means of pressure or percussion applied to ends of the center-pin it is so upset as to fill the hole in the spur-wheel and form a collar on each side, as shown in Figs. 2 and 4. With a regulator so made the wheel can never work loose, and the product is cheaper and more perfect than when cast whole. Two, three, or more wheels may be secured to the center-pin at the same time, the number of wheels required being in proportion to the width of the wick.

What I claim as my invention, and desire to secure by Letters Patent, is—

The combination of one or more spur-wheels with the center-pin or axis fastened together by upsetting the center-pin so as to fill a polygonal hole in each spur-wheel and form a collar on each side of it, substantially in the manner and for the purposes herein set forth.

JOHN POMEROY.

In presence of—
MILO PECK,
LUCIUS G. PECK.